Dec. 13, 1938.　　　M. R. FENSKE ET AL　　　2,139,943
PROCESS AND APPARATUS FOR TREATING MINERAL OILS
Filed July 13, 1934　　　3 Sheets—Sheet 1
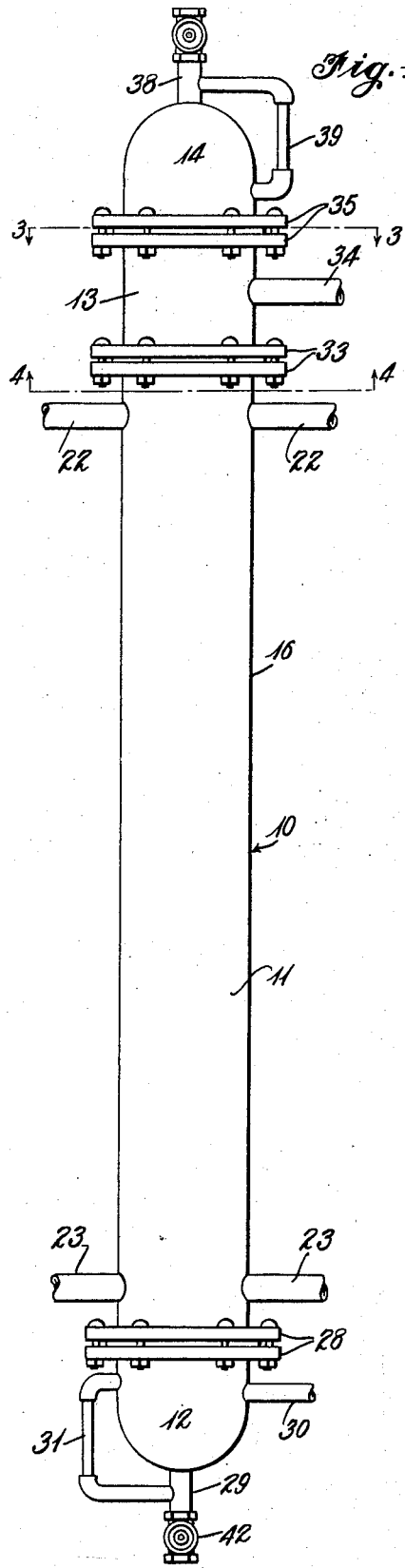
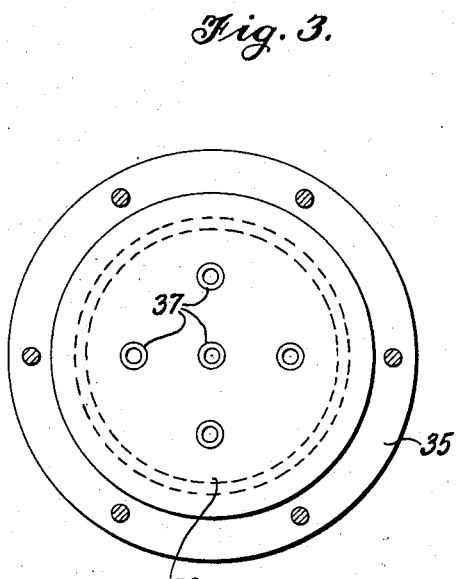
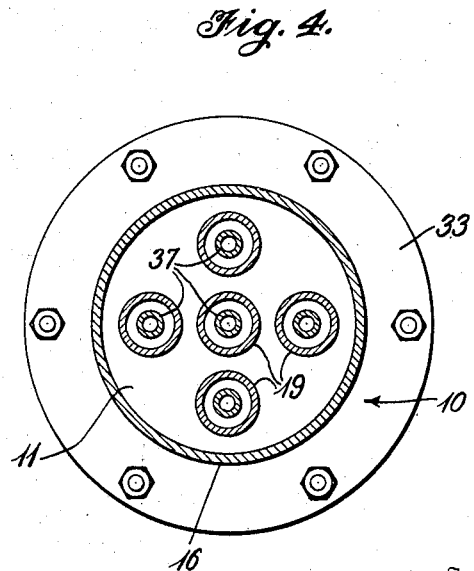
Inventors
Merrell R. Fenske
and Wilbert B. McCluer
By Hugo A. Kennman
Attorney

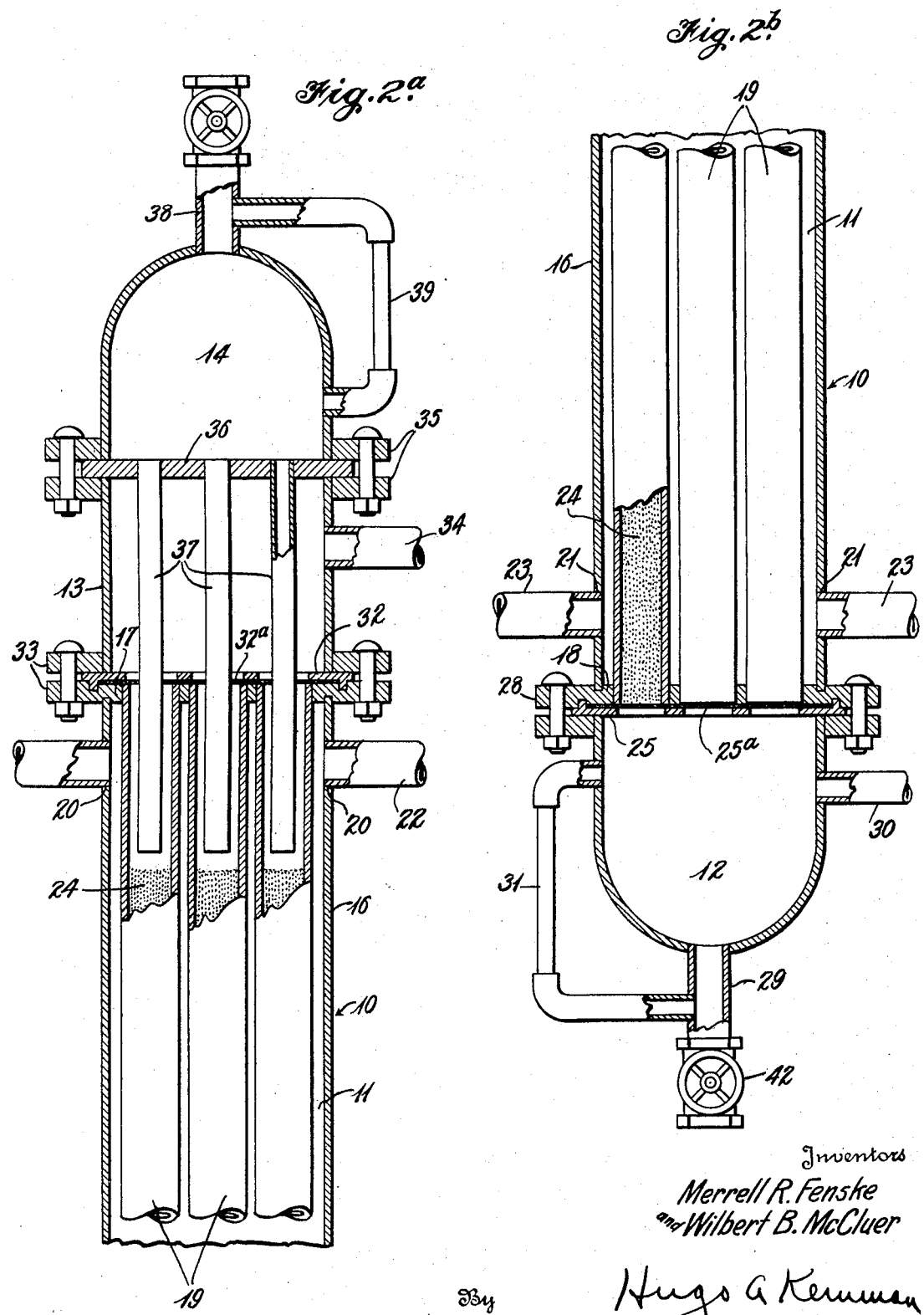

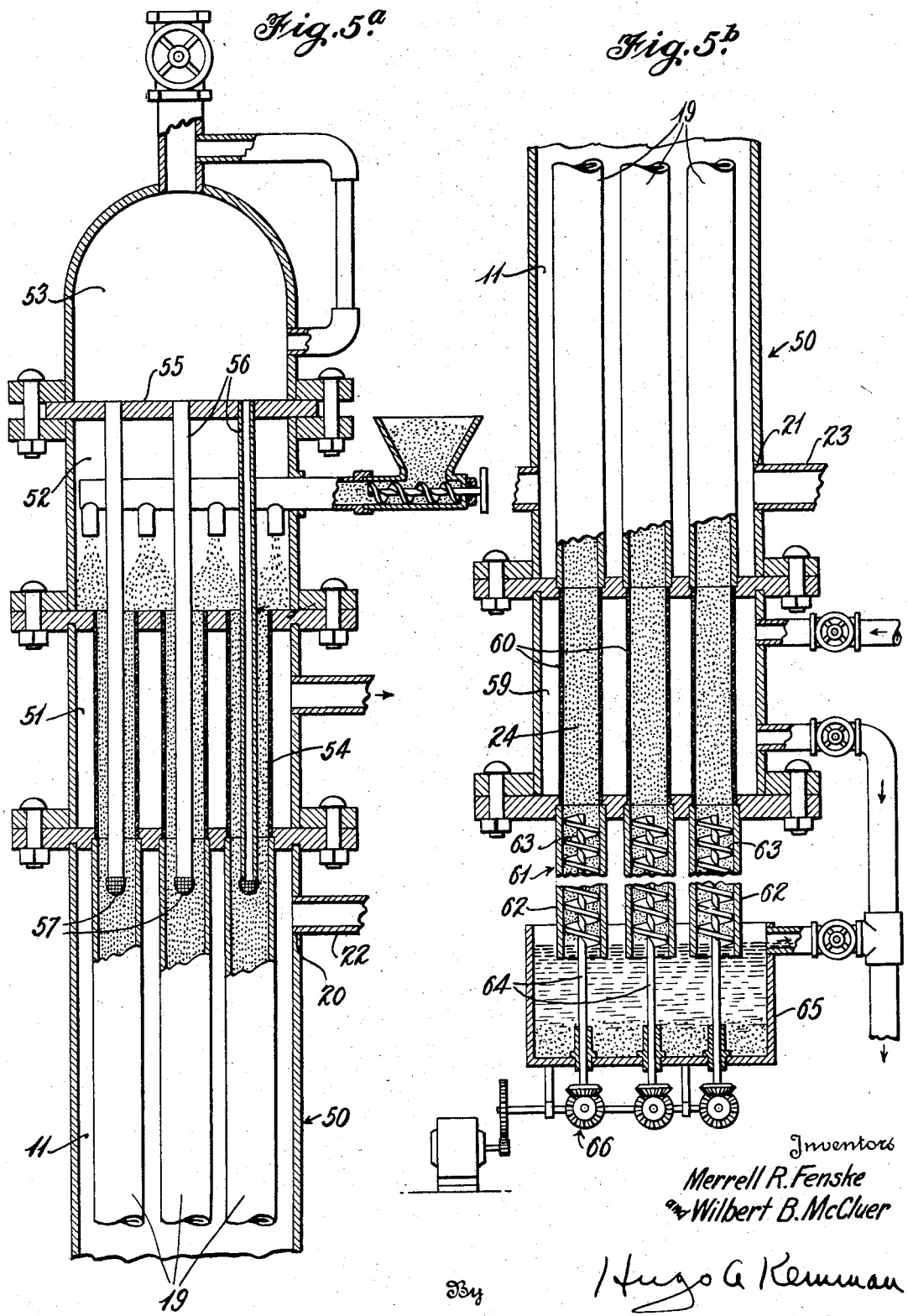

Patented Dec. 13, 1938

2,139,943

UNITED STATES PATENT OFFICE 2,139,943

PROCESS AND APPARATUS FOR TREATING MINERAL OILS

Merrell R. Fenske and Wilbert B. McCluer, State College, Pa., assignors to Pennsylvania Petroleum Research Corporation, a corporation of Pennsylvania Application July 13, 1934, Serial No. 735,026

12 Claims. (Cl. 196—13)

This invention pertains generally to the purification of mineral oils, and pertains particularly to the extraction from crude petroleum or products thereof of materials considered deleterious, by the simultaneous use of a selective solvent and an adsorbent material.

Various means are employed for the removal from crude petroleum or fractions thereof of undesired substances. The substances to be removed depend generally upon the source of the crude and/or the character of the prior treatment thereof. These materials include asphaltic substances, resins, nitrogen compounds, sulphur compounds, oxygen-containing compounds, unsaturated materials, naphthenic acids, color bodies, etc.

In the prior art, there are two recognized methods employed for the purpose of extracting these materials. One of these methods involves extracting the crude petroleum or fraction thereof with a suitable solvent, and the other involves filtration through a suitable adsorbent material such as fuller's earth, silica gel, bauxite, activated charcoal, Florida earth, etc.

In solvent extraction processes, considerable difficulty is encountered in obtaining a clean separation between desired and undesired materials, making it necessary to extract from the original oil larger quantities than would be necessary if a sharp separation could be obtained. In other words, the extract or material of lesser value contains constituents which, if separated from the extract, would have a quality comparable to that of the original oil if not of the raffinate.

Furthermore, solvents are unable to extract certain substances from lubricating oils which appear to be soluble in the solvents. This is apparently due to the inefficiency of the processing method or the incomplete utilization of the solvent in prior art methods of treatment.

Filtration through adsorbent material is largely used for removing color bodies and other similar undesired constituents from the oil. As a rule, large quantities of adsorbent material are required. Furthermore, the adsorbent material must be repeatedly revivified, and eventually its adsorbent characteristics entirely disappear.

The invention herein is based upon the discovery that sharper separation between desired and undesired constituents may be obtained by extracting the oil with a suitable solvent in the presence of an adsorbent material, or, in other words, by extracting in the presence of a filter medium.

Any of the batch methods customary in solvent extraction may be resorted to, in which case, the adsorbent material is added to the batch in a manner similar to that employed in contact filtration. After suitable agitation of the oil, solvent, and adsorbent material, the solid may be filtered out, whereupon the liquid will form into a two-layer system and the layers may be separated by decantation, or otherwise.

It is preferred, however, to employ a system similar to the continuous countercurrent systems employed in solvent extraction in which case the filtration is analogous to percolation.

By extracting and filtering simultaneously and in the same sphere of action, a decidedly sharper separation between desired and undesired materials may be obtained. Furthermore, the useful life of the adsorbent material may be greatly extended, and the necessity for revivification made much less frequent.

Any of the batch, multiple batch, batch countercurrent, continuous countercurrent, or other systems for obtaining contact between solvent and oil in solvent extraction processes may be adapted to the invention, provision being made in each case for obtaining proper contact between solvent and oil, adsorbent material and oil, and solvent and adsorbent material.

Continuous countercurrent systems, and particularly those in which the countercurrent flow is obtained by a difference in density between the solvent and oil, are very suitable. The apparatus employed in these systems, in many cases, takes the general shape of a tower. In these cases, the adsorbent material may be placed in the tower in a manner similar to packing. For the most efficient operation, care should be exercised to avoid substantial channeling. Channeling through adsorbent material is generally associated with increased pressure, resulting from the desire to increase the rate of flow.

Apparatus adapted to permit a high rate of flow without channeling is illustrated in the drawings in which Fig. 1 is an elevation of a column adapted for carrying out the process;

Figures 2A and 2B comprise a sectional elevation of the column shown in Fig. 1, Fig. 2A illustrating the upper portion and Fig. 2B the lower portion;

Fig. 3 is a section on line 3—3 of Fig. 1;

Fig. 4 is a view taken on line 4—4 of Fig. 1; and

Figures 5A and 5B comprise a sectional elevation of a modified form of column.

Referring now more particularly to Figures 1 to 4 of the drawings in which a detailed construction is shown for the purposes of illustration, 10 is a column comprising a vertically arranged main portion 11, a lower feeding and segregating chamber 12, an upper segregating chamber 13, and an upper feeding chamber 14.

Main portion 11 may be of any suitable construction, and preferably presents a path to the countercurrently flowing oil and solvent which is of a character that will bring the oil and solvent into intimate contact of a very large surface area compared to their volumes. This is accomplished by employing adsorbent material, preferably in granular form, as packing. The construction of column 11 is also preferably such that a substantial degree of channeling cannot take place. This is accomplished by causing the counterflow of solvent and oil to take place through a path or a plurality of paths of relatively small diameter with the adsorbent material arranged in the path or paths as a contact medium.

To obtain these results, shell 16 of main portion 11 is provided with tube sheets 17 and 18 at its ends. Tube sheets 17 and 18 have aligned apertures which receive and support the opposite ends of a plurality of spaced tubes 19.

Shell 16 is shown with apertures 20 at its top and apertures 21 at its bottom. These apertures are shown with tubular extensions 22 and 23 respectively to facilitate connection with any suitable means for circulating, heating, or cooling fluids over and about the outsides of tubes 19 for temperature control purposes.

Tubes 19 are packed with a suitable adsorbent material 24 preferably in granular form, the granules being of any desired size. The adsorbent material may be supported in the tubes by any suitable means, for instance, by plate 25 held between flanges 28 at the bottom of column 10, said plate being reticulated opposite tubes 19 and supporting a strip of fabric 25A, of finer mesh than the adsorbent material. Any other construction may be substituted.

Tubes 19 may be of any desired number, that is, one or more. The number employed will be governed by the desired through-put of the column.

The tubes 19 may have a cross section of any desired geometrical configuration and within certain limits of any desired area. The cross section of each tube 19 is preferably limited to an area sufficiently small to prevent serious channeling after the adsorbent material has been arranged therein.

The preferred limiting cross sectional area for each tube 19 will be not only a function of the type and mesh of adsorbent material employed, but also of the manner in which the adsorbent material is arranged in each tube, for instance, of the degree of uniformity of distribution. Since the tubes 19 may have sides which are straight or indented or which are of any other surface configuration, the departure of a tube from a straight or continuous form will have its influence. For this reason a definite limit in cross sectional area, which, if exceeded in size will no longer demonstrate the substantial increase in efficiency which we have discovered results from a constriction of cross sectional area, cannot be given, but may be readily determined, for instance, by testing the efficiency of single tubes of different sizes after the adsorbent material to be employed is arranged therein.

It may be stated as a general rule that one should proceed with caution after exceeding a cross sectional area equivalent to that of a circular tube in the neighborhood of three inches in diameter although, with the proper selection of adsorbent material and a careful distribution in each tube, it is possible that larger cross sectional areas may be employed while in other cases smaller cross sectional areas may be required.

Therefore, the term "relatively small cross sectional area" or its equivalent, when employed in this specification and in the claims is intended to mean a cross section which, when taken in conjunction with the specific adsorbent material employed, is sufficiently small to materially increase the contacting efficiency because of the constriction of its area.

Whether or not channeling will become an important factor will also depend somewhat upon the pressure differential and the physical state of the adsorbent material.

Although a large diameter tube is likely to be less efficient, it may, nevertheless, be employed, for the invention in its broadest aspects includes not only any tower or column, regardless of diameter or type, but also any type of contacting apparatus.

The lower feeding and segregating chamber 12 is attached to the main portion 11 by flanges 28 and freely communicates with the tubes 19 through the reticulations in plate 25 and fabric 25A. Chamber 12 has a tubular extension 29 at its bottom for the egress of the heavier solution and a tubular extension 30 in its side for ingress of the lighter liquid. A sight gage 31 may be provided to show the height of the heavier liquid in chamber 12 or extension 29 as the case may be.

Segregating chamber 13 is attached to the upper end of main portion 11 by flanges 33. To prevent the adsorbent material from being carried up into chamber 13, a plate 32 secured between flanges 33 may be provided to secure a layer of fabric 32A over the upper ends of tubes 19, the plate 32 being reticular opposite the ends of the tubes. Any other construction may be substituted.

Chamber 13 has a tubular extension 34 at its side for the egress of lighter solution.

Upper feeding chamber 14 is disposed above chamber 13 and is secured thereto by flanges 35.

The disc-like plate 36 is disposed between chambers 14 and 13. Plate 36 has a plurality of feeding tubes 37. There is one tube 37 for each tube 19. Each tube 37 extends downward through chamber 13 and into a tube 19 for at least a short distance.

Chamber 14 has a tubular extension 38 at its top for the ingress of heavier liquid and a sight gage 39 to show the head on the heavier liquid. Any suitable remotely registering gage may be substituted for sight gage 31 or for sight gage 39 or both particularly if all of the instruments are to be mounted on a single instrument board.

In operation, the heavier liquid (either solvent or oil as the case may be) is fed into chamber 14 through extension 38 and is preferably maintained therein at a suitable level. The lighter liquid (either oil or solvent as the case may be) is fed into chamber 12 through extension 30. The heavier liquid flows downwardly through tubes 37 into tubes 19. Any suitable metering means may be provided so that the feeding of heavier liquid will be uniform. For instance, tubes 37 might be of equal length and equal inner diameter.

Similar metering orifices might be provided for feeding the lighter liquid by substituting a construction similar to that of chambers 13 and 14 for chamber 12. However, it is found that the lighter liquid will be fed uniformly up into tubes 19 since the lighter liquid will enter each tube 19 at the same pressure.

The two liquids pass each other in tubes 19 due to the difference in density and intimately contact each other in so doing, whereby the oil is extracted by the solvent. At the same time, the oil intimately contacts the adsorbent material, whereby the oil is filtered. The solvent intimately contacts the adsorbent material whereby a very large part of those materials which are adsorbed from the oil are dissolved in the solvent. The adsorbent material is thus continuously revivified.

As a result of the foregoing, two immiscible solutions of different density are formed, the lighter of which collects in chamber 13 and the heavier of which collects in chamber 12.

The lighter solution may be continuously withdrawn through extension 34, and the heavier solution may be continuously withdrawn through extension 29.

A two-layer system is preferably maintained in chamber 12 or extension 29 to assure the upward flow of the lighter liquid. Valve 42 and gage 31 will assist in maintaining the two-layer system.

It will be noted that in the construction shown the solvent and oil flow countercurrently to each other in a plurality of separate streams of substantially equal size, the streams of each liquid flowing through separate paths of relatively small diameter, with an adsorbent material disposed preferably substantially uniformly throughout said paths. By this means channeling of any one stream through its associated countercurrently flowing stream is substantially prevented and the two countercurrently flowing liquids are caused to spread out into thin films over and about the adsorbent material thus presenting not only a very large surface area to each other but also to the adsorbent material.

Since the result of having tubes 19 of substantially the same size and of substantially equally dividing each feed liquid among the tubes 19 is to maintain substantially the same proportion of solvent phase to oil phase in each tube, it will be obvious that tubes 19 may be of different sizes and that the feeding rates may vary accordingly, especially if substantially the same proportion of phases is maintained in each tube.

In other words, the result of having tubes 19 of the same size and of maintaining uniform feeding conditions for each tube, is to cause the raffinate phase produced by each tube to be of substantially the same composition as the raffinate phase produced by any other tube; and to cause the extract phase produced by each tube to be of substantially the same composition as the extract phase produced by any other tube. From this it will be obvious that if tubes 19 should vary in size the feeding rates may be adjusted to obtain similar conditions.

However, improved results may be obtained to a certain degree even though ideal conditions are not approached.

Should difficulty be experienced with flooding of the column, the rate of feed of oil and/or solvent may be reduced, and/or the viscosity of the oil might be reduced either by raising the temperature of extraction or by the previous mixing with the oil of a quantity of the solvent up to that amount which normally goes into solution therewith. The tendency to flood might also be diminished by modifying the granular character of the adsorbent material so as to afford more free space.

The column may have any desired height, that is, the tubes 19 may be of any desired length.

For instance, the tubes 19 might be 30 feet in length and might be packed with 15 to 30 mesh fuller's earth; or, if a number of columns are to be connected in series, obviously the tubes 19 may be of shorter length since the effective length of the combination will be the sum of the lengths of the tubes 19 of all of the columns.

If the solvent is selective as to type of molecule, and depending, of course, upon the particular solvent employed, the order in which the various classes of hydrocarbon molecules will be dissolved by the solvent will generally be unsaturated, aromatic, naphthene, paraffin. By striking coincidence, this is the same order in which the various classes of hydrocarbons are adsorbed. The result is that as the oil proceeds through the column, it gives up these materials in substantially the order named to both the solvent and to the adsorbent material but probably not with the same ease or degree with respect to any class of compounds or individual compounds of the class. Therefore, certain compounds which are not readily adsorbed may be dissolved out by solvent, and other compounds which are not readily dissolved out directly by solvent may be adsorbed, and then (whether with or without a change in molecular structure), dissolved by solvent. Other materials will be dissolved either directly or after being adsorbed depending upon the distribution ratio.

For any one extraction temperature, the solvent to oil ratio and the rate of flow is so adjusted that the desired yield and quality of raffinate is obtained.

Although the adsorbent material may remain stationary, it may be considered as moving relatively countercurrently to the oil, but at a slower rate than the solvent. In other words, except for mechanical difficulties, the column might be moved countercurrently to the oil flow. The action of the adsorbent material on the oil in view of its selectivity as to molecular type is similar to that of a countercurrent system as far as the distribution ratio is concerned.

Conversely, when considering the solution of adsorbed materials in the solvent, the adsorbent material may be considered as moving relatively countercurrently to the solvent.

The efficiencies of countercurrent systems are, therefore, made possible in the use of this invention.

Many solvents which are selective as to type of molecule and therefore suitable for solvent extraction purposes are also suitable for maintaining the adsorbent medium substantially revivified. Among these solvents are methyl alcohol, ethyl alcohol, isopropyl alcohol, acetone, liquid sulfur dioxide, ethyl acetate, and the ethylene glycol ethers and their acyl derivatives.

Other solvents selective as to type of molecule are phenol, benzonitrile, aniline, methyl acetate, cresylic acid, pyridine, phenyl acetate, benzaldehyde, propionaldehyde, allyl alcohol, furfural, nitrotoluene, mononitronaphthalene, furfuryl alcohol, beta beta dichlorethyl ether, cresol, crotonaldehyde, acrolein, acetaldehyde, aniline oil, estersol, ethylene chlorohydrin, nitrobenzene, tetrahydrofurfuryl alcohol, mixed toluidines, orthotoluidine, xylidine, polyhydric alcohols, tricresyl phosphate, tolyl formate, methyl thiocyanate, allyl isothiocyanate, phenyl thiocyanate, tolualdehyde, etc.

Should a solvent not possess the desired revivification properties, such properties might be imparted by adding to the solvent, for instance, 10% to 15% or more of ethyl alcohol, methyl alcohol or acetone; or a suitable quantity of an organic acid such as acetic acid or even an inorganic acid such as hydrochloric acid or sulfuric acid in relatively small amounts, might be added to the solvent, particularly if the acid and solvent do not react chemically.

When batch methods are employed, the adsorbent material may be added to the oil at the same time that the solvent is added to the oil or before or after.

By decreasing the extraction temperature in the direction of solvent flow in a countercurrent system and by suitable adjustment of the various temperatures, the solvent may be brought to a supersaturated condition before leaving the column, which results in a selective precipitation of a part of the dissolved hydrocarbons in the inverse order of their solubility. These precipitated materials flow through the column along with the oil and are redissolved in the order of their solubility in the solvent, only to be reprecipitated in the inverse order of their solubility. The most soluble hydrocarbons are carried off with the solvent as extract, and the least soluble are carried off with the oil as raffinate.

A similar rectifying effect can be obtained by the introduction into the column, that is into the tubes 19 at one or more points intermediate their ends, of a substance or substances which tend to decrease the solubility of the oil in the solvent (such as another solvent of lower solubility for the oil). Upon the introduction of such substance or substances at a point or in graduated amounts at a plurality of points along the path of solvent flow, hydrocarbons may be selectively precipitated only to be redissolved and reprecipitated in the manner above pointed out.

This same rectifying effect may be obtained by decreasing the solvent-oil ratio along the column, for instance, by diverting the solvent stream, vaporizing a part of the solvent and returning the depleted solvent stream and precipitate to the column. If a plurality of columns are joined in series, the vaporization might take place between columns, in which case the precipitate would be returned to the preceding column and the solvent stream would continue on to the subsequent column.

Column 10 might also be employed for purely precipitation purposes. For instance, a solution of solvent and oil might be flowed through column 10 and by reducing the solvent power of the solvent in the direction of solvent flow such as by reducing the temperature, introducing a substance or substances and/or vaporizing a part of the solvent, oil components may be precipitated in the inverse order of their solubility. The precipitate may be caused to flow countercurrently to the solution by choosing a suitable point of feed for the solution.

For instance, if the precipitate is heavier than the solution, the solution may be fed into the column at 30 and may leave the column at 34. In this case, the precipitate would flow downwardly through the column, collect in chamber 12 and would be removed through valve 42. On the other hand, if the precipitate is lighter than the solution, the solution may be fed into the column through chamber 14 and removed through valve 42. In this case, the precipitate would rise through the column, collect in chamber 13 and would be removed through 34.

Rectification of the precipitate results from its flowing countercurrently to the solution, since any "more soluble" components will be substituted in the solution for "less soluble" components, the latter being precipitated. This rectifying action may be increased by having the solution enter the column in an unsaturated state, since in this case, solution of "more soluble" components may take place other than and in addition to solution by substitution.

A saturated solution may be brought to an unsaturated state by raising the temperature, by adding more solvent, and/or by removing substances which tend to reduce the solubility of hydrocarbons in the solvent.

Column 10 may also be adapted to certain extraction processes wherein a counterflow of solvents is effected, and in which the oil is introduced into the counterflow. In this case, the heavier solvent would be fed into the column through chamber 14, the lighter solvent through the chamber 12, and the oil would be metered into tubes 19 at a suitable point or points intermediate the ends thereof by any suitable means such as metering orifices.

The feeding of solvent and/or oil might take place at a plurality of points along the column. Various other modifications are possible.

While the invention has been particularly described in connection with the treatment of liquid oil, it is to be understood that it may be employed for the treatment of other materials whether in the liquid, solid, or vapor phase at normal temperatures and pressures. For instance, paraffin wax may be purified by flowing the wax in melted form through the column countercurrently to a wax purifying solvent such as ethylene dichloride or methyl ethyl ketone, both of which have a relatively low solvent power for paraffin wax, but have a relatively high solvent power for entrained oil. Increased pressures may be employed to maintain the solvents wholly or partially in the liquid phase as desired.

Should the adsorbent packing material become exhausted or should it be desired to revivify the same, it is merely necessary to remove it from the column and to replace it with new or revivified adsorbent material.

It is, of course, possible to provide a construction whereby the adsorbent material may be caused to move slowly through the column and thus be continuously replaced by new or revivified adsorbent material.

A construction suitable for this purpose is illustrated in Figures 5A and 5B wherein column 50 takes the general form of column 10 of Figures 2A and 2B. In column 50, main portion 11 of column 10 has been duplicated for purposes of simplicity in description.

In Figure 5A, chambers 13 and 14 of Figure 2A have been substituted by chambers 51, 52, and 53.

Chamber 51 is the segregating chamber for light solution and differs from chamber 13 in that tubular filters 54 (which may be of any suitable construction) join tubes 19 with chamber 52.

Chamber 52 is for the feeding of adsorbent material into the tops of the tubular filters 54 through which the adsorbent material is conducted into the tubes 19.

Chamber 53 may be in all respects similar to chamber 14. The disc-like plate 55, between chambers 52 and 53 has a plurality of apertures similar to plate 36 in which are secured the ends of tubes 56, which may be in all respects similar to tubes 37 except that tubes 56 are somewhat longer.

If desired, means 57 may be arranged over the ends of tubes 56 to prevent clogging by adsorbent material.

In Figure 5B, chamber 12 of Figure 2B is substituted by chamber 59. Chamber 59 differs from chamber 12 chiefly in that tubular filters 60 extend from the lower ends of tubes 19 entirely through chamber 59, each tube 60 connecting with an individual adsorbent material flow-regulator 61 illustrated as a tubular casing 62 housing a screw 63. Shaft 64 of each screw 63 is illustrated as extending down through the bottom of a receiver 65, and for the purposes of assuring uniform conditions in each tube 19, shafts 64 may be uniformly driven as illustrated diagrammatically at 66.

In the operation of column 50, the solvent and oil and light and heavy solutions flow in and out of the column in the same manner as they do in column 10.

The essential differences are that the light solution disengages itself from the adsorbent material in chamber 51 by passing through tubular filters 54, the heavy solution disengages itself from the adsorbent material in chamber 59 by passing through tubular filters 60, and the solvent or oil, whichever is the lighter, enters the bottoms of tubes 19 by first passing inwardly through tubular filters 60.

Screws 63 may be operated at any desired rate, for instance, at a rate just sufficient to maintain the adsorbent material in tubes 19 in a suitably active condition. The operation may be intermittent or constant as desired. The screws 63 preferably comprise a plurality of turns of small pitch and preferably fit closely in their housings so as to prevent an inordinate amount of seepage into receiver 65.

Any other construction may be substituted for the screws 63, or a construction might be adopted which would cause the adsorbent material to ascend through tubes 19 rather than descent therethrough.

For instance, it might be desired to have the adsorbent material flow countercurrently to the oil also when the oil is heavier than the solvent.

However, to cause adsorbent material to flow through the column, a special construction such as that of Figures 5A and 5B is not essential, since a slurry of adsorbent material and solvent, or of adsorbent material and oil might be made and might be fed through the column 10 countercurrently to the other liquid, for instance, by feeding into column 10 through chamber 14 and modifying tubes 37 to take care of the desired rate of flow. Separation of spent slurry from the other liquid might take place in the usual manner by layer formation, whereupon the slurry might be separated into its constituents.

The term solvent in its broader phases includes any compound or compounds whether in the vapor, liquid and/or solid phase and regardless of its influence upon the base material.

Having particularly described the invention, it is to be understood that changes, omissions, additions, substitutions, and/or modifications other than those specifically mentioned may be made without departing from the spirit of the invention. The claims, therefore, are intended to be limited only as required by the prior art.

For instance the solvent and oil might be mixed mechanically and then flowed in one direction through the tower, or, for instance, through any of the filters used for percolating oil through adsorbent material. If formation layers in the mechanical mixtures makes feeding difficult or unsatisfactory the temperature of the oil and solvent might be raised so as to form a solution of same. This might be followed by cooling for instance in the tower or filter so as to permit the desired formation of phases.

Reference is made to applicants' copending applications Serial No. 688,416 filed September 6, 1933, Serial No. 699,050 filed November 21, 1933, Serial No. 697,344 filed November 9, 1933, Serial No. 697,858 filed November 13, 1933, and Serial No. 10,932 filed March 13, 1935.

We claim:

1. A process for purifying a mineral oil comprising flowing said mineral oil in a plurality of segregated streams of substantially equal size and of relatively small cross sectional area countercurrently to a like number of similar streams of a suitable solvent, each segregated stream of oil contacting a segregated stream of solvent in a separate path containing an adsorbent material.

2. A process for purifying a lubricating oil comprising flowing said lubricating oil in a plurality of segregated streams of substantially equal size and of relatively small cross sectional area countercurrently to a like number of similar streams of suitable solvent, each segregated stream of oil contacting a segregated stream of solvent in a separate path containing an adsorbent material.

3. A process for purifying a lubricating oil comprising flowing said oil through a column countercurrently to a suitable solvent under conditions causing the formation of two liquid phases, and flowing adsorbent material through said column countercurrently to said oil, said adsorbent material being present in said column in sufficient quantity to function as a contact medium between said solvent and oil.

4. Apparatus comprising, a column, means associated with said column for causing a mineral oil and a solvent to flow countercurrently therethrough, means for dividing each liquid into a plurality of streams of substantially equal size, a plurality of segregated paths, an adsorbent material in each path, and means for contacting each stream of each liquid with a separate stream of the other liquid in a separate path of said segregated paths.

5. Apparatus comprising, a column, means associated with said column for causing a mineral oil and a solvent to flow countercurrently therethrough, means for dividing each liquid into a plurality of streams of substantially equal size, a plurality of segregated paths, an adsorbent material in each path, means for contacting each stream of each liquid with a separate stream of the other liquid in a separate path of said segregated paths, means for feeding adsorbent material into said column, and means for causing said adsorbent material to flow through said paths.

6. Apparatus comprising, a column, means associated with said column for causing a mineral oil and a solvent to flow countercurrently therethrough, means for dividing each liquid into a plurality of streams of substantially equal size, a plurality of segregated paths, an adsorbent material in each path, means for contacting each stream of each liquid with a separate stream of the other liquid in a separate path, means for feeding adsorbent material into said column, and means for causing said adsorbent material to flow through said paths countercurrently to said oil.

7. Apparatus comprising, a column, means associated with said column for causing liquid phases to flow countercurrently therethrough by virtue of a difference in density such as in the solvent treatment of petroleum products, means for dividing each phase into a plurality of streams, a plurality of segregated paths, an adsorbent material in each path, and means for contacting each stream of each phase with a separate stream of each other phase in a separate segregated path.

8. A process for treating a mineral oil with a solvent comprising countercurrently contacting said mineral oil and said solvent by virtue of a difference in their densities in a plurality of paths of relatively small cross sectional area, said paths containing adsorbent material, and maintaining the proportion of solvent to oil at least substantially the same in each path.

9. A process for treating a mineral oil with a solvent comprising countercudrently contacting said mineral oil and said solvent by virtue of a difference in their densities in a plurality of paths of relatively small cross sectional area, said paths containing adsorbent material, maintaining the proportion of solvent to oil at least substantially the same in each path, and reducing the solvent capacity of the solvent in the direction of solvent flow to set up reflux conditions in said paths.

10. A process for treating a mineral oil with a solvent comprising flowing a solution of oil and solvent through a plurality of paths of relatively small cross sectional area, said paths containing adsorbent material, reducing the solvent capacity of the solvent in the direction of solvent flow to throw out of solution mineral oil components of lesser solubility, and choosing the direction of solution flow through said paths so that said precipitated oil components will flow countercurrently to said solution by virtue of a difference in density.

11. A process comprising countercurrently flowing two solvents of incomplete and partial miscibility by virtue of a difference in their densities through a plurality of paths of relatively small cross sectional area, said paths containing adsorbent material, and introducing a mineral oil into said paths intermediate the ends thereof.

12. A process for treating a petroleum product with a solvent comprising, countercurrently contacting said petroleum product and said solvent by virtue of a difference in their densities in a column having a plurality of phase contacting paths of relatively small cross sectional area, and maintaining said petroleum product in the form of a slurry with adsorbent material.

MERRELL R. FENSKE.
WILBERT B. McCLUER.